United States Patent

Mueller

[11] Patent Number: 5,935,673
[45] Date of Patent: Aug. 10, 1999

[54] PROTECTIVE COATINGS FOR OPTICAL DISC INFORMATION RECORDING MEDIA, AND METHODS AND APPARATUS FOR APPLYING SAME

[75] Inventor: William R. Mueller, Clarks Summit, Pa.

[73] Assignee: WEA Manufacturing Inc., Olyphant, Pa.

[21] Appl. No.: 08/909,000

[22] Filed: Aug. 8, 1997

[51] Int. Cl.⁶ .................................................. B32B 3/00
[52] U.S. Cl. .................. 428/64.1; 428/64.2; 428/64.4; 428/65.2; 428/41.7; 428/913; 430/270.11; 430/495.1; 430/945; 369/283; 427/155; 427/164
[58] Field of Search .................. 428/64.1, 64.2, 428/64.4, 65.2, 40.1, 41.7, 913; 430/270.11, 495.1, 945; 369/283, 288; 427/155, 164, 346

[56] References Cited

U.S. PATENT DOCUMENTS

| 4,736,966 | 4/1988 | Haddock et al. | 283/69 |
| 5,518,788 | 5/1996 | Invie et al. | 428/65.1 |

FOREIGN PATENT DOCUMENTS

| 599655 | 6/1994 | European Pat. Off. | G11B 7/24 |
| 195 42 022 | 5/1996 | Germany | G11B 7/24 |
| WO 85/00238 | 1/1985 | WIPO | G11B 7/24 |
| WO 96/21928 | 7/1996 | WIPO | G11B 7/24 |

*Primary Examiner*—Elizabeth Evans
*Attorney, Agent, or Firm*—Fish & Neave; Robert R. Jackson

[57] ABSTRACT

To protect the optical surface of optical disc information recording media such as a compact disc (CD) or a digital versatile disc (DVD), that surface is coated with a removable layer of a material that does not significantly alter the optical properties of the disc. Whenever the coating layer may have become damaged, it is removed and replaced with a new layer.

35 Claims, 2 Drawing Sheets

PROTECTIVE COATINGS FOR OPTICAL DISC INFORMATION RECORDING MEDIA, AND METHODS AND APPARATUS FOR APPLYING SAME

BACKGROUND OF THE INVENTION

This invention relates to optical disc information recording media such as compact discs (CDs) and digital versatile discs (DVDs), and more particularly to protecting the optical surface or surfaces of such discs.

Some optical discs receive more than the usual amount of use and consequent handling. For example, optical discs owned by lending libraries and rental businesses may see such service. The optical surfaces of discs in such use are subject to physical damage in the form of fingerprints, scratches, scuffs, etc. As such damage accumulates over time, the disc eventually becomes unplayable and an economic loss to the owner.

In view of the foregoing, it is an object of this invention to extend the useful life of optical discs.

It is a more particular object of this invention to provide protection for the optical surfaces of optical discs.

SUMMARY OF THE INVENTION

These and other objects of the invention are accomplished in accordance with the principles of the invention by providing removable, and therefore renewable, protective coatings for the optical surfaces of optical discs. Preferred coatings of this kind have thickness in the range from about 5 microns to about 20 microns, a refractive index that is approximately the same as the refractive index of the coated optical portion of the disc, and a tensile modulus which is preferably less than 100,000 p.s.i. and which therefore helps make the coating easily removable from the disc (e.g., by the use of some adhesive tape to pick up the coating and peel it away from the disc surface). Illustrative coating materials include vinyl or vinyl-like resins that are sometimes referred to as peel off lacquers.

Illustrative coating methods include cleaning the surface of the disc to be coated (e.g., by spraying a cleaning liquid on a radially inner portion of the disc while spinning the disc to cause the cleaning liquid to flow radially out over the disc surface by centrifugal force). The disc surface may then be dried (e.g., by blowing air on the disc while continuing to spin it). The coating material is then applied to the surface of the disc (e.g., by spraying that material in liquid form onto the disc in the same general way that the cleaning liquid may be sprayed on and concurrently rotating the disc as in the above-mentioned exemplary cleaning step). If applied in liquid form, the coating may then be dried or cured (e.g., in the same manner that the disc may be dried after the above-described cleaning step or by exposing the coating to ultraviolet ("U.V.") light in the case of U.V. curable coatings).

Illustrative apparatus for coating an optical disc includes a structure for rotating the disc about its normal axis of rotation, a structure for spraying cleaning liquid onto the rotating disc, a structure for directing a drying gas flow onto the rotating disc, a structure for spraying coating material in liquid form onto the rotating disc, and a structure for catching excess liquid (whether cleaning liquid or coating liquid) spun off from the surface of the rotating disc. Controls may be provided for automating or at least partly automating the operating sequence of the various apparatus components.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
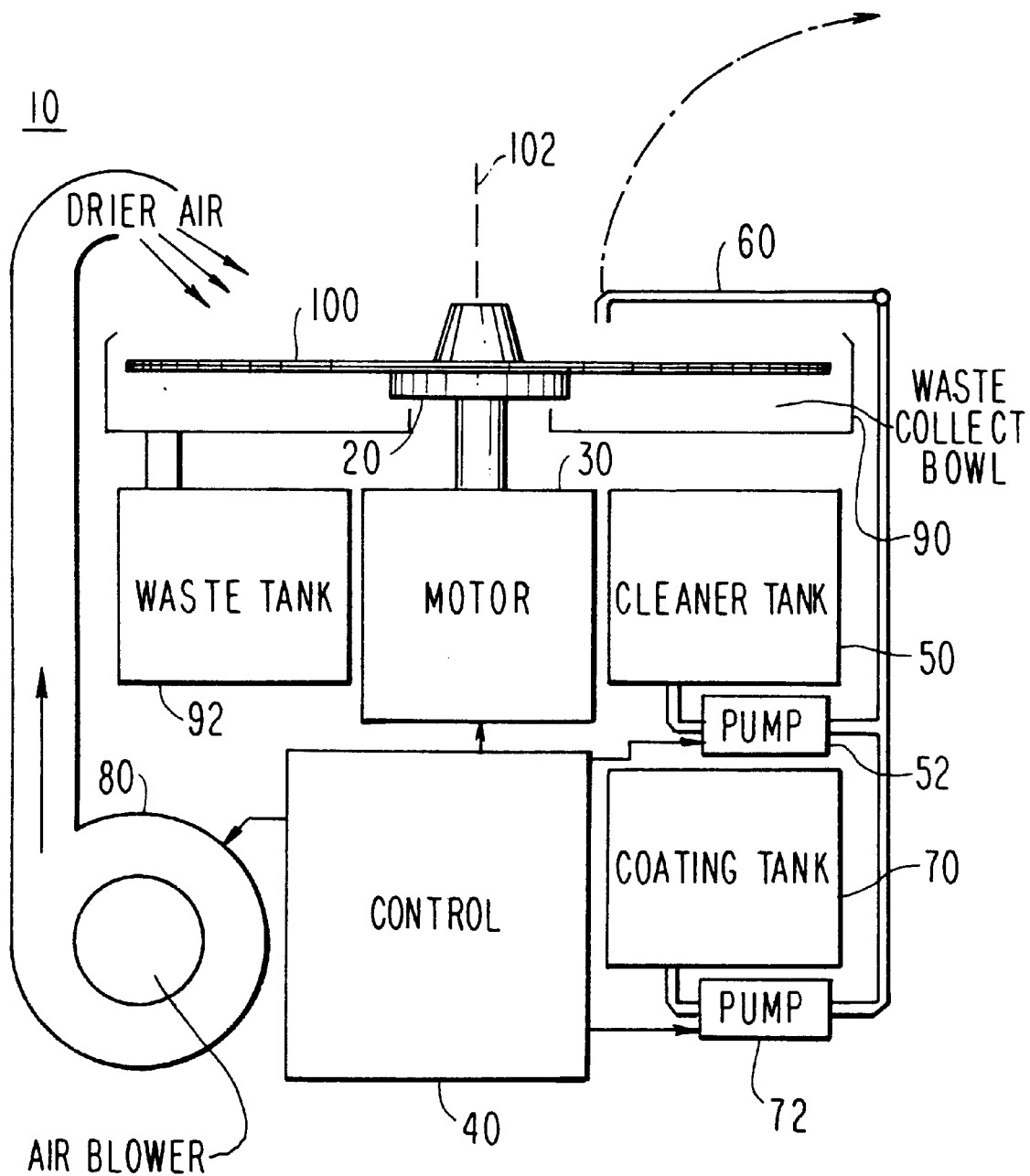
FIG. 1 is a simplified elevational view, partly in section and partly in schematic block diagram form, of illustrative apparatus for coating optical discs in accordance with this invention.

The illustrative optical disc coating apparatus 10 shown in FIG. 1 includes a turntable 20 for supporting a disc 100 to be coated. Turntable 20 is rotatable by motor 30 to rotate disc 100 about its normal central axis of rotation 102. Motor 30 (and various other components of apparatus 10 that are described below) is controlled by control circuitry 40. Cleaning liquid usable in cleaning a disc 100 to be coated is stored in cleaner tank 50 and can be selectively pumped up to and out through dispensing arm 60 by pump 52 (which may be controlled by circuitry 40). Coating material in liquid form is stored in coating tank 70 and can be selectively pumped up to and out through dispensing arm 60 by pump 72 (which may also be controlled by circuitry 40). Blower 80 (which may again be controlled by circuitry 40) selectively blows drying gas (e.g., air) onto the surface of disc 100. Excess cleaning or coating liquid thrown off from disc 100 is caught by annular catchment structure 90 and drains into waste tank 92.

A disc 100 to be coated is placed on turntable 20. (To facilitate this operation (and subsequent removal of the disc) dispensing arm 60 may be pivotable up or to the side out the way.) Turntable 30 is then rotated to rotate disc 100 about axis 102. With disc 100 rotating and dispensing arm 60 in the position shown in FIG. 1, pump 52 is operated to pump cleaning liquid from tank 50 up and out through the free end of the dispensing arm onto a radially inner portion of the disc. The rotation of the disc causes the cleaning liquid to spread out over and clean the entire surface of the disc from the radially inner portion that initially receives the cleaning liquid to the extreme outer edge. Cleaning liquid that is thrown radially outward off the spinning surface of the disc is caught by catchment structure 90 and drained down into waste tank 92.

After disc 100 has been sufficiently exposed to cleaning liquid, pump 52 is stopped and blower 80 is turned on to blow drying gas (e.g., air) onto the surface of the disc to dry that surface. Motor 30 may continue to rotate disc 100 during this drying operation.

After blower 80 has been operated for a sufficient time to dry disc 100, the blower is turned off and pump 72 is turned on to pump coating liquid from tank 70 out onto the disc through dispensing arm 60. Motor 30 rotates disc 100 during this operation so that the coating liquid is distributed over the surface of the disc from the radially inner portion that initially receives the liquid to the extreme outer edge. Any excess coating liquid that is thrown off from the outer edge of the disc is caught by catchment structure 90 and drained to waste tank 92.

When a sufficient amount of coating liquid has been supplied to the disc, pump 72 is stopped. When the coating liquid has spread out over the surface of the disc into the desired relatively thin coating layer, blower 80 is turned on again to blow drying gas onto the coating to help dry and possibly cure the coating material. Motor 30 may continue to rotate disc 100 during this operation of blower 80.

After blower 80 has operated long enough to dry the coating on disc 100, the blower is stopped, and motor 30 is also stopped if that has not already been done. Dispensing arm 60 is moved out of the way, and disc 100 is removed from turntable 20. If the other side of disc 100 also requires coating, then disc 100 may be turned over and placed back on turntable 20 so that all of the above-described operations can be repeated for the second side of the disc.

Some coating materials may require additional processing to cure them. For example, some coating materials may require exposure to ultraviolet ("U.V.") light for curing. Any required additional processing may be performed with disc 100 either on or off apparatus 10. For example, if U.V. curing is required, a U.V. light source may be provided for directing U.V. light onto disc 100 while it is rotating or stationary on turntable 20. Alternatively, disc 100 may be removed from apparatus 10 and placed in separate U.V. curing apparatus.

Figure 2:
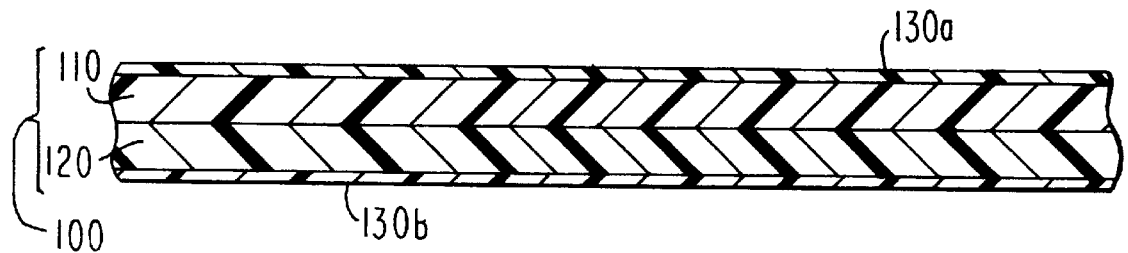
FIG. 2 is a simplified sectional view of a representative portion of an illustrative optical disc coated in accordance with the invention.

FIG. 2 shows an illustrative optical disc 100 with coatings in accordance with this invention. In the particular embodiment shown in FIG. 2, disc 100 is a two-sided DVD (which is somewhat like two CDs bonded back to back). Thus disc 100 has two plastic (e.g., polycarbonate) layers 110 and 120. A coating layer 130*a* or 130*b* in accordance with this invention is provided on each of the optical surfaces of disc 100. Layers 130 protect the permanent optical surfaces of the disc from such damage as fingerprints, scratches, and scuffs.

Figure 3:
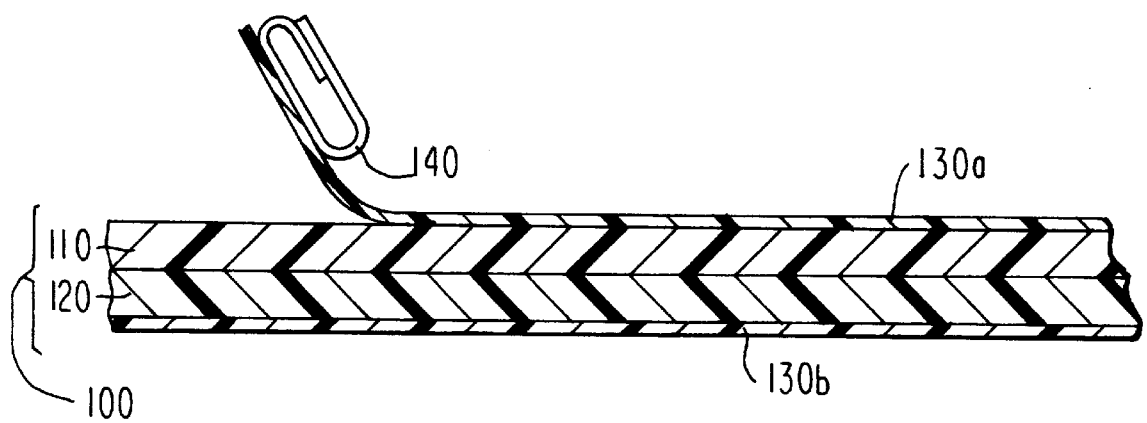
FIG. 3 is another view similar to FIG. 2 showing one of the coating layers of this invention being removed from the optical disc.

The preferred thickness of each layer 130 is in the range from about 5 microns to about 20 microns. The refractive index of the material of coating layers 130 is preferably the same as the refractive index of the underlying plastic material of the disc (e.g., about 1.55±0.1 for use on polycarbonate optical surfaces). The tensile modulus of the material of coating layers 130 is preferably less than 100,000 p.s.i. (ASTM standard D638) so as to permit the layers to be easily picked up and peeled off the disc (e.g., by using an adhesive tape to stick to and aid in lifting the coating layer up off the disc). For example, FIG. 3 shows a loop 140 of adhesive tape (like commercially available cellophane tape) being used to peel or lift coating layer 130*a* up off the underlying surface of disc 100. Whenever the coating layer or layers 130 on a disc need to be renewed, the old layer or layers are removed (e.g., as shown in FIG. 3), and the disc is recoated as described above in connection with FIGS. 1 and 2. For example, this may be done each time a borrowed disc is returned to the lending library or rental business that owns it.

Suitable coating materials are generally classified as peel off lacquers. For the most part these materials are vinyl or vinyl-based resins. Examples of suitable commercially available materials include Silatect available from Trylaner International of Gainsville, N.Y., Aquapell available from Morton International of Strullendorf, Germany, and DIC SD 1700 available from Dainippon Inc. & Chemicals of Saitama, Japan.

It will be understood that the foregoing is only illustrative of the principles of this invention, and that various modifications can be made by those skilled in the art without departing from the scope and spirit of the invention. For example, separate dispensing arms like arm 60 may be used for the cleaning and coating liquids if preferred. Forced drying gas from blower 80 is optional and may not be needed, either following the application of cleaning liquid or following the application of coating liquid or both. Motor 30 may be controlled by circuitry 40 to rotate disc 100 at various speeds at different times. For example, during dispensing of coating liquid, motor annular ring of coating liquid has been deposited on the disc, dispensing of that liquid may be stopped and the rotation of disc 100 may be substantially accelerated to spread the ring of coating liquid out into the desired relatively thin coat over the surface of the disc.

The invention claimed is:

1. An optical disc comprising:

a first layer containing optically readable recorded information; and a removable coating adhered directly to a surface of the first layer, the information being optically readable from the disc through the coating and the surface.

2. The optical disc defined in claim 1 wherein the coating comprises a peel off lacquer.

3. An optical disc comprising:

a first layer containing optically readable recorded information; and a removable coating on a surface of the first layer, the information being optically readable from the disc through the coating and the surface, wherein the thickness of the coating is in the range from about 5 to about 20 microns.

4. An optical disc comprising:

a first layer containing optically readable recorded information; and a removable coating on a surface of the first layer, the information being optically readable from the disc through the coating and the surface, wherein the coating is selected to have approximately the same refractive index as the first layer.

5. An optical disc comprising:

a first layer containing optically readable recorded information; and a removable coating on a surface of the first layer, the information being optically readable from the disc through the coating and the surface, wherein the refractive index of the coating is approximately 1.55±0.1.

6. An optical disc comprising:

a first layer containing optically readable recorded information; and a removable coating on a surface of the first layer, the information being optically readable from the disc through the coating and the surface, wherein the tensile modulus of the coating is less than 100,000 p.s.i.

7. An optical disc comprising:

a first layer containing optically readable recorded information;

a removable coating on a surface of the first layer, the information being optically readable from the disc through the coating and the surface; and a second layer containing optically readable recorded information, the second layer being adhered to the first layer on the side of the first layer which faces away from the coating.

8. The optical disc defined in claim 7 further comprising:
a second removable coating on the surface of the second layer which faces away from the first layer, the information of the second layer being optically readable through the through the second coating and the surface of the second layer.

9. The method of protecting an optical surface of an optical disc comprising:
applying a removable coating to the surface as the disc rotates about a central axis of rotation of the disc, the coating being selected and applied so that it does not interfere with reading information from the disc via the coating and the surface.

10. The method defined in claim 9 further comprising:
removing the coating when the coating may have become damaged; and
repeating the applying step to apply another coating to the surface.

11. The method defined in claim 9 wherein the coating comprises a peel off lacquer.

12. The method of protecting an optical surface of an optical disc comprising:
applying a removable coating to the surface, the coating being selected and applied so that it does not interfere with reading information from the disc via the coating and the surface, wherein the coating is applied with a thickness in the range from about 5 to about 20 microns.

13. The method of protecting an optical surface of an optical disc comprising:
applying a removable coating to the surface, the coating being selected and applied so that it does not interfere with reading information from the disc via the coating and the surface, wherein the coating is selected to have approximately the same refractive index as the material of the surface.

14. The method of protecting an optical surface of an optical disc comprising:
applying a removable coating to the surface, the coating being selected and applied so that it does not interfere with reading information from the disc via the coating and the surface, wherein the refractive index of the coating is approximately 1.55±0.1.

15. The method of protecting an optical surface of an optical disc comprising:
applying a removable coating to the surface, the coating being selected and applied so that it does not interfere with reading information from the disc via the coating and the surface, wherein the tensile modulus of the coating is less than 100,000 p.s.i.

16. The method of protecting an optical surface of an optical disc comprising:
applying a removable coating to the surface, the coating being selected and applied so that it does not interfere with reading information from the disc via the coating and the surface, wherein the applying comprises:
depositing coating material in liquid form on the surface; and
curing the coating material on the surface.

17. The method defined in claim 16 wherein the depositing comprises:
forming a localized deposit of the liquid-form coating material on the surface; and
spreading the liquid-form coating material out from the localized deposit over the surface into a layer of substantially uniform thickness.

18. The method defined in claim 17 wherein the forming comprises:
making a ring of the liquid-form coating material on the surface, the ring being substantially concentric with a central axis of rotation of the disc, and the ring being on a radially inner portion of the surface; and
rotating the disc about the central axis to cause the liquid-form coating material to flow radially out from the ring over the surface.

19. The method defined in claim 16 wherein the curing comprises:
blowing drying gas on the coating material.

20. The method of protecting an optical surface of an optical disc comprising:
applying a removable coating to the surface, the coating being selected and applied so that it does not interfere with reading information from the disc via the coating and the surface; and
cleaning the surface prior to the applying.

21. Apparatus for protecting an optical surface of an optical disc comprising:
a structure configured to apply a removable coating to the surface by rotating the disc about a central axis of rotation of the disc, the coating being selected and applied so that it does not interfere with reading information from the disc via the coating and the surface.

22. The apparatus defined in claim 21 wherein the coating comprises a peel off lacquer.

23. Apparatus for protecting an optical surface of an optical disc comprising:
a structure configured to apply a removable coating to the surface, the coating being selected and applied so that it does not interfere with reading information from the disc via the coating and the surface, wherein the coating is applied with a thickness in the range from about 5 microns to about 20 microns.

24. Apparatus for protecting an optical surface of an optical disc comprising:
a structure configured to apply a removable coating to the surface, the coating being selected and applied so that it does not interfere with reading information from the disc via the coating and the surface, wherein the coating is selected to have approximately the same refractive index as the material of the surface.

25. Apparatus for protecting an optical surface of an optical disc comprising:
a structure configured to apply a removable coating to the surface, the coating being selected and applied so that it does not interfere with reading information from the disc via the coating and the surface, wherein the refractive index of the coating is approximately 1.55 ±0.1.

26. Apparatus for protecting an optical surface of an optical disc comprising:
a structure configured to apply a removable coating to the surface, the coating being selected and applied so that it does not interfere with reading information from the disc via the coating and the surface, wherein the tensile modulus of the coating is less than 100,000 p.s.i.

27. Apparatus for protecting an optical surface of an optical disc comprising:
a structure configured to apply a removable coating to the surface, the coating being selected and applied so that it does not interfere with reading information from the disc via the coating and the surface, wherein the structure configured to apply a removable coating comprises:

a first substructure configured to deposit coating material in liquid form on the surface.

28. The apparatus defined in claim 27 wherein the first substructure produces a localized deposit of the liquid-form coating material on the surface, and wherein the structure configured to apply a removable coating further comprises:

a second substructure configured to spread the liquid-form coating material out from the localized deposit over the surface with substantially uniform thickness.

29. The apparatus defined in claim 28 wherein the second substructure comprises:

componentry configured to rotate the disc about an axis with which the disc is concentric.

30. The apparatus defined in claim 29 wherein the localized deposit is a ring substantially concentric with the axis.

31. The apparatus defined in claim 28 wherein the substructure configured to apply a removable coating further comprises:

a third substructure configured to apply a flow of drying gas to the surface after operation of the second substructure.

32. Apparatus for protecting an optical surface of an optical disc comprising:

a structure configured to apply a removable coating to the surface, the coating being selected and applied so that it does not interfere with reading information from the disc via the coating and the surface; and componentry configured to clean the surface prior to operation of the structure configured to apply a removable coating.

33. The apparatus defined in claim 32 wherein the componentry comprises:

a first substructure for applying cleaning liquid to the surface.

34. The apparatus defined in claim 33 wherein the componentry further comprises:

a second substructure configured to rotate the disc about an axis with which the disc is concentric during operation of the first substructure.

35. The apparatus defined in claim 33 wherein the componentry comprises:

a further substructure configured to apply a flow of drying gas to the surface after operation of the first substructure.

* * * * *

UNITED STATES PATENT AND TRADEMARK OFFICE
CERTIFICATE OF CORRECTION

PATENT NO. : 5,935,673
DATED : August 10, 1999
INVENTOR(S) : William R. Mueller

It is certified that error appears in the above-identified patent and that said Letters Patent is hereby corrected as shown below:

Column 4,
Line 10, "motor annular ring" should be -- motor 30 may rotate disc 100 relatively slowly. After an annular ring --.

Signed and Sealed this

First Day of January, 2002

Attest:

Attesting Officer

JAMES E. ROGAN
Director of the United States Patent and Trademark Office